United States Patent [19]

Endo et al.

[11] Patent Number: 4,652,928
[45] Date of Patent: Mar. 24, 1987

[54] SOLID STATE IMAGE SENSOR WITH HIGH RESOLUTION

[75] Inventors: Yukio Endo; Nozomu Harada; Okio Yoshida, all of Yokohama, Japan

[73] Assignee: Kabushiki Kaisha Toshiba, Kawasaki, Japan

[21] Appl. No.: 619,375

[22] Filed: Jun. 11, 1984

[30] Foreign Application Priority Data

Jun. 15, 1983 [JP] Japan .................................. 58-107097
Jun. 15, 1983 [JP] Japan .................................. 58-107098

[51] Int. Cl.$^4$ ............................................. H04N 3/14
[52] U.S. Cl. ............................................. 358/213
[58] Field of Search ................. 358/212, 213, 44, 209, 358/41; 250/578

[56] References Cited

U.S. PATENT DOCUMENTS

| | | | |
|---|---|---|---|
| 3,944,816 | 3/1976 | Harada | 358/213 |
| 4,145,721 | 3/1979 | Beaudouin et al. | 358/213 |
| 4,167,754 | 9/1979 | Naguma et al. | 358/167 |
| 4,320,413 | 3/1982 | Takemura | 358/44 |
| 4,335,406 | 6/1982 | Ohba et al. | 358/213 |
| 4,413,284 | 11/1983 | Izumita et al. | 358/213 |
| 4,435,730 | 3/1984 | Bendell et al. | 358/213 |
| 4,479,143 | 10/1984 | Watanabe et al. | 358/44 |
| 4,499,497 | 2/1985 | Levine | 358/213 |
| 4,517,603 | 5/1985 | Epsztein et al. | 385/213 |
| 4,535,363 | 8/1985 | Harada et al. | 358/213 |
| 4,543,601 | 9/1985 | Harada et al. | 358/213 |
| 4,554,586 | 11/1985 | Tanuma et al. | 358/213 |

FOREIGN PATENT DOCUMENTS 58-29275 2/1983 Japan .

OTHER PUBLICATIONS

SID '81 Digest (23.1) 288–289, Image–Shift Resolution Enhancement Techniques for CCD Imagers; K. A. Hoagland; 1982.

Primary Examiner—Gene Z. Rubinson
Assistant Examiner—Stephen Brinich
Attorney, Agent, or Firm—Oblon, Fisher, Spivak, McClelland & Maier

[57] ABSTRACT

A solid state image sensing system includes a CCD and a vibration table. The vibration table swing-drives the CCD in response to a drive signal generated by a drive pulse generator, in such a manner that the CCD is vibrated in a horizontal direction in one vibration cycle consisting of two succeeding frame periods each having A and B fields.

8 Claims, 37 Drawing Figures

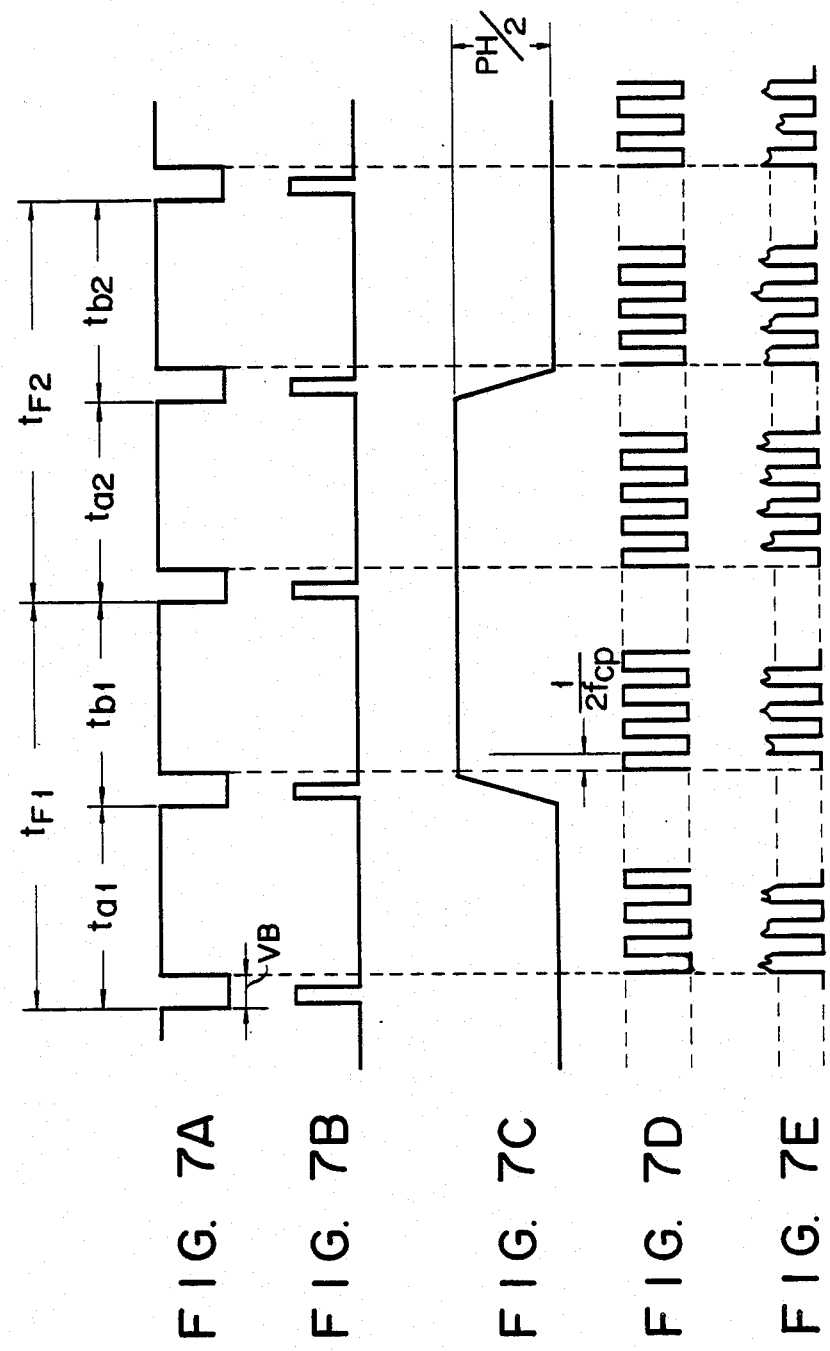

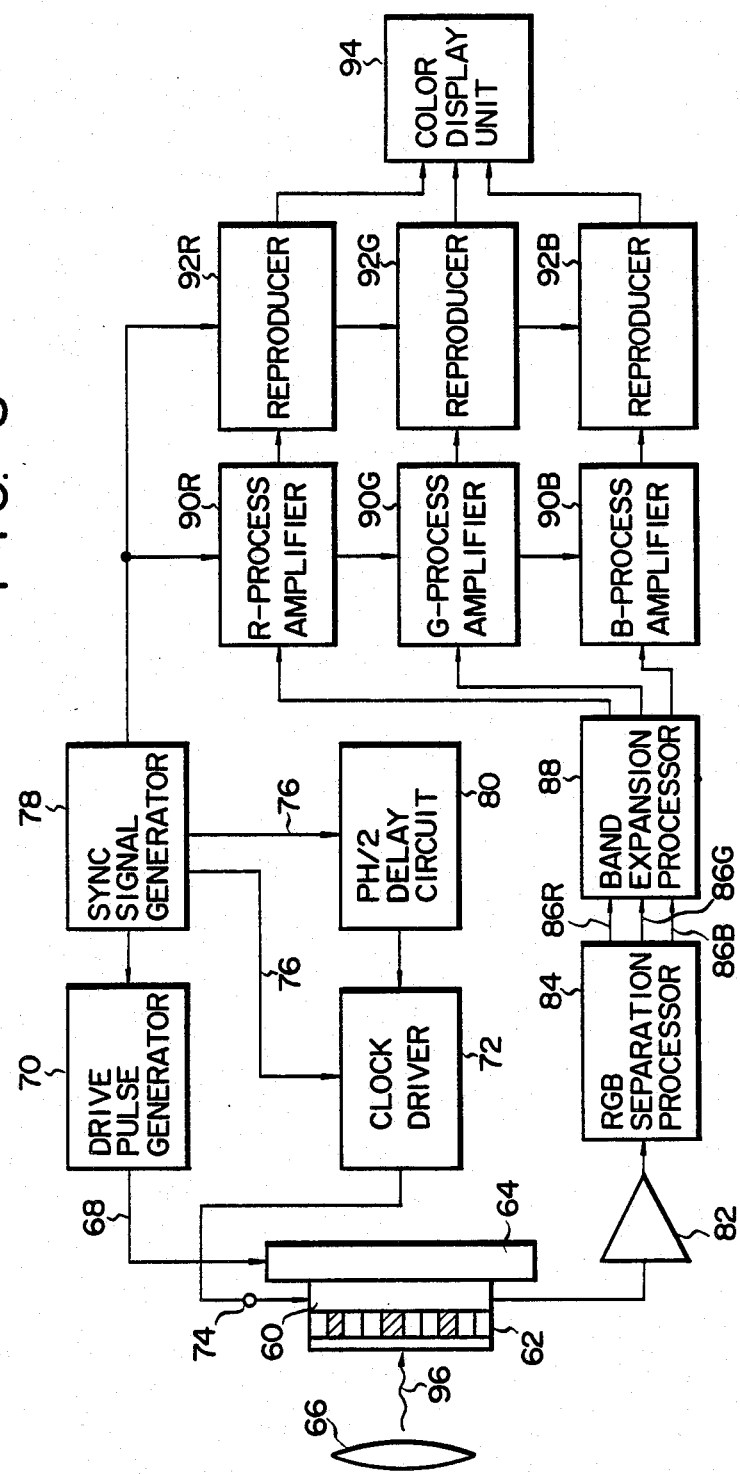

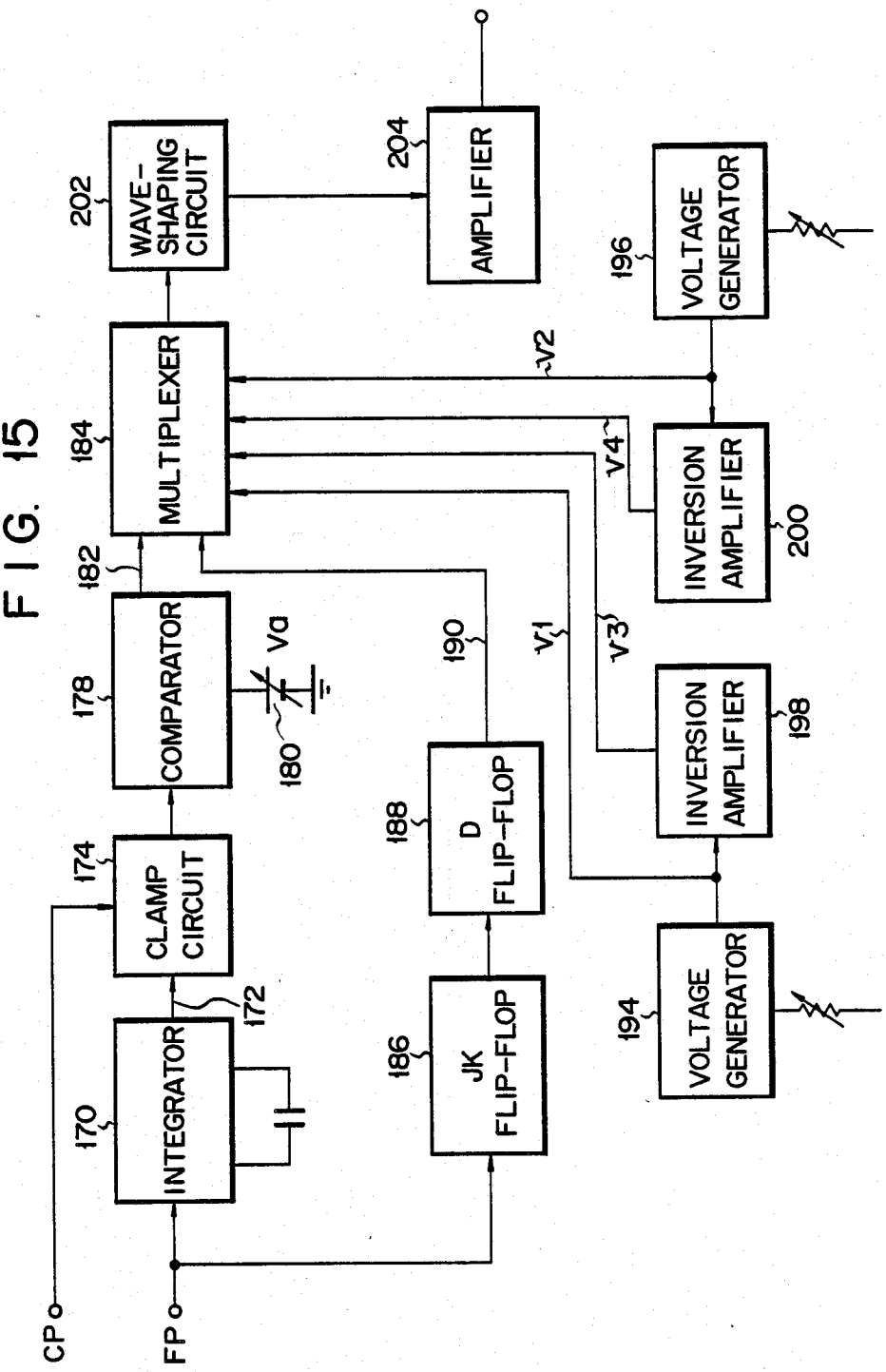

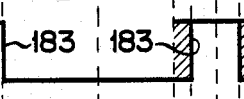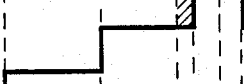

SOLID STATE IMAGE SENSOR WITH HIGH RESOLUTION

BACKGROUND OF THE INVENTION

The present invention relates in general to a solid state image sensing device and, in more particular, to a CCD image sensor which is swing-driven to relatively and periodically shift in position relative to incident image light.

In a conventional solid state image sensor such as an interline transfer type CCD (to be referred to as an IT-CCD hereinafter), it is easily understood that the number of pixels must be increased to obtain a high resolution of a video image in accordance with an interlaced scanning technique. However, even such a conventional IT-CCD having a standard number of pixels has the largest chip size among LSIs. If the number of pixels is simply increased in such a CCD to satisfy the need for high resolution, its chip size is further increased. On the other hand, in order to increase the number of pixels without changing the present CCD chip size, the integration of pixels must be greatly enhanced (e.g., more than 4 times). It is technically difficult to prepare such a high-density CCD. Even if development of improved fabrication techniques allows the manufacture of such a CCD in the near future, the circuit configuration for driving such a CCD becomes complicated and power consumption becomes high, thus entailing new problems.

In order to solve the problem concerning the number of pixels vs packing density, the CCD is periodically displaced relative to incident image light, thereby picking up a high-resolution image. In two field periods constituting one frame period in the NTSC system, when the CCD is swung at an amplitude corresponding to ½ the pixel pitch (PH) such that pixels are positioned in different sampling positions along a horizontal direction, the spatial sampling points along the horizontal direction can be virtually increased. Therefore, the horizontal resolution of the one-frame image can be substantially doubled even if a conventional low-resolution IT-CCD chip is used.

According to this swing image pickup technique, however, the number of spatial sampling pixels along a single scanning line on a one-field screen is the same as that of a real array of pixels of the CCD and cannot be doubled. When an A field screen is combined with a B field screen obtained such that every other scanning line is scanned and a given scanned pixel on an A-field scanning line is offset by ½ a pitch from a corresponding scanned pixel on a B-field scanning line, so that the A and B fields constitutes a one-frame picture, a high-contrast image profile line (white/black boundary line), especially a profile line extending vertically on the screen, is observed as a zigzag line in a one-frame picture. It is undesirable that an originally linear (or curved) smooth profile portion becomes a zigzag line, thus degrading the image quality.

SUMMARY OF THE INVENTION

It is an object of the present invention to provide a new and improved solid state image sensing device capable of attaining higher resolution.

It is another object of the present invention to provide a new and improved solid state image sensing device capable of attaining higher resolution and realizing better image quality keeping false signals, such as moiré, minimum.

According to the present invention, an image pickup system, which produces a frame image according to an interlacing image pickup technique, contains a solid-state image sensing device for generating signal charges which represent field images for one frame in response to light radiation representing image information. The image sensing device comprises a sensing section provided with at least one linear cell array having cells to receive the light radiation and generate and store charges which correspond to the light radiation, and at least one transferring section arranged adjacent to the at least one linear cell line and extending along said cell line to read out and transfer the charges stored in said sensing section. A swing-driver device is coupled to the image sensing device. The swing-driver device vibrates the image sensing device along a horizontal direction substantially perpendicular to the linear cell array in a swing mode having as a single vibration period two successive frame periods each consisting of a plurality of field periods. Each cell of the cell array generates at least four sampling points arranged in a matrix shape on the A and B field scanning lines of the video image within an interlaced scanning period corresponding to the one vibration period described above.

BRIEF DESCRIPTION OF THE DRAWINGS

The present invention is best understood by reference to the accompanying drawings, in which:

FIGS. 7A to 7E are timing charts of signals generated from the main part of the system shown in FIG. 1;

FIG. 8 is a block diagram showing the overall arrangement of a color CCD image sensing system in accordance with a second embodiment of the present invention;

FIG. 15 is a block diagram showing a circuit arrangement of a drive pulse generator shown in FIG. 8;

FIGS. 16A to 16G are figures showing signal waveforms of main signals obtained at the main components of the drive pulse generator;

DETAILED DESCRIPTION OF THE PREFERRED EMBODIMENTS

Figure 1:
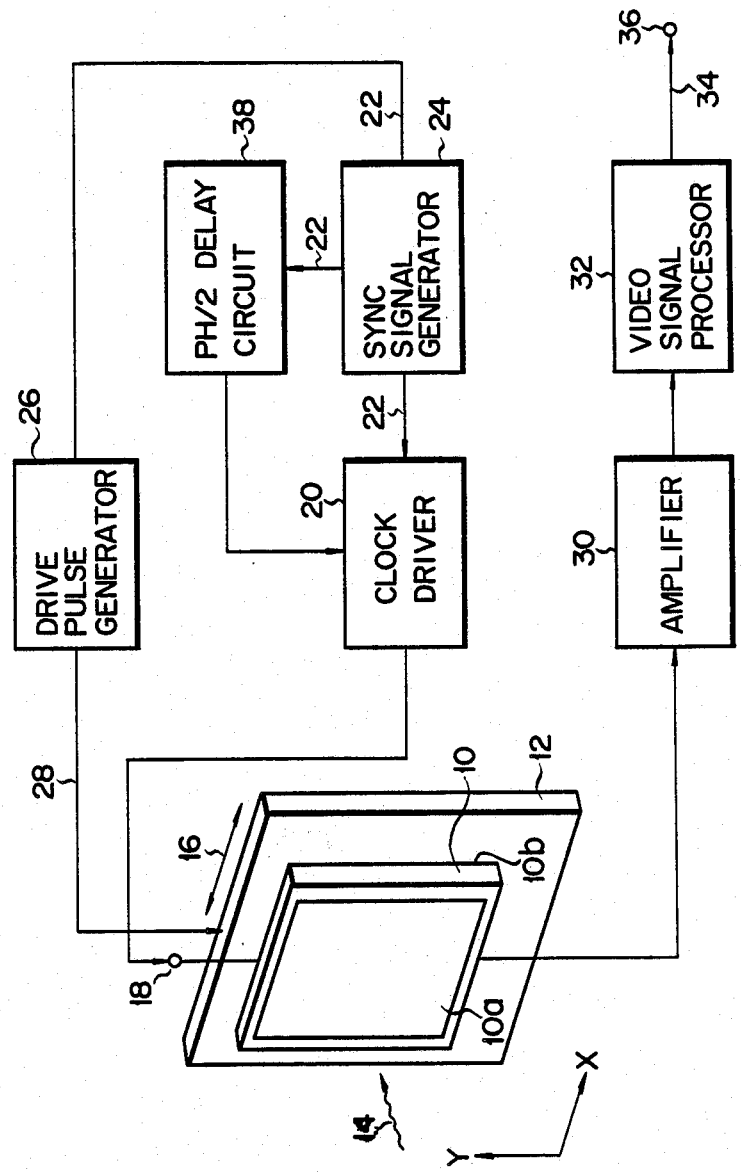
FIG. 1 is a block diagram showing the whole arrangement of a monochrome CCD image sensing system according to a first embodiment of the present invention.

Referring now to FIG. 1, there is schematically illustrated an interlaced scanning solid state image sensor arrangement according to a first embodiment of the present invention. A solid state image sensor, for example, an interline transfer type charge-coupled device (IT-CCD) 10 has an ordinary number of picture elements, for example, 500×400. The IT-CCD 10 is fixed to a vibration table 12 at a rear side 10b opposite to an image sensing area 10a. The table 12 is comprised of a bimorph piezoelectric element. The table 12 vibrates or swings in a plane normal to incident image rays 14 in a horizontal direction as indicated by an arrow 16. Therefore, the IT-CCD 10 fixed to the table 12 is periodically displaced relative to the incident image rays 14, thereby performing a swing image pickup operation.

The IT-CCD 10 is electrically connected through a gate terminal 18 to a clock driver 20. The driver 20 serves to appropriately drive the CCD 10, responsive to a sync signal 22 generated by a sync signal generator 24. The sync signal, i.e., timing signal 22 is also supplied to a drive pulse generator 26, which produces a drive signal 28 in response to the timing signal 22 and supplies it to the vibration table 12. The output terminal of the vibrating IT-CCD 10 is connected through a pre-amplifier 30 to a video signal processing circuit 32, which generates a video signal 34 through a video output terminal 36. It should be noted that a delay circuit 38 connected to the circuits 20 and 24 functions to delay the timing of horizontal readout of the CCD 10 by PH/2 (where PH is the horizontal picture element pitch) in synchronism with the vibration pulse period.

Figure 2:
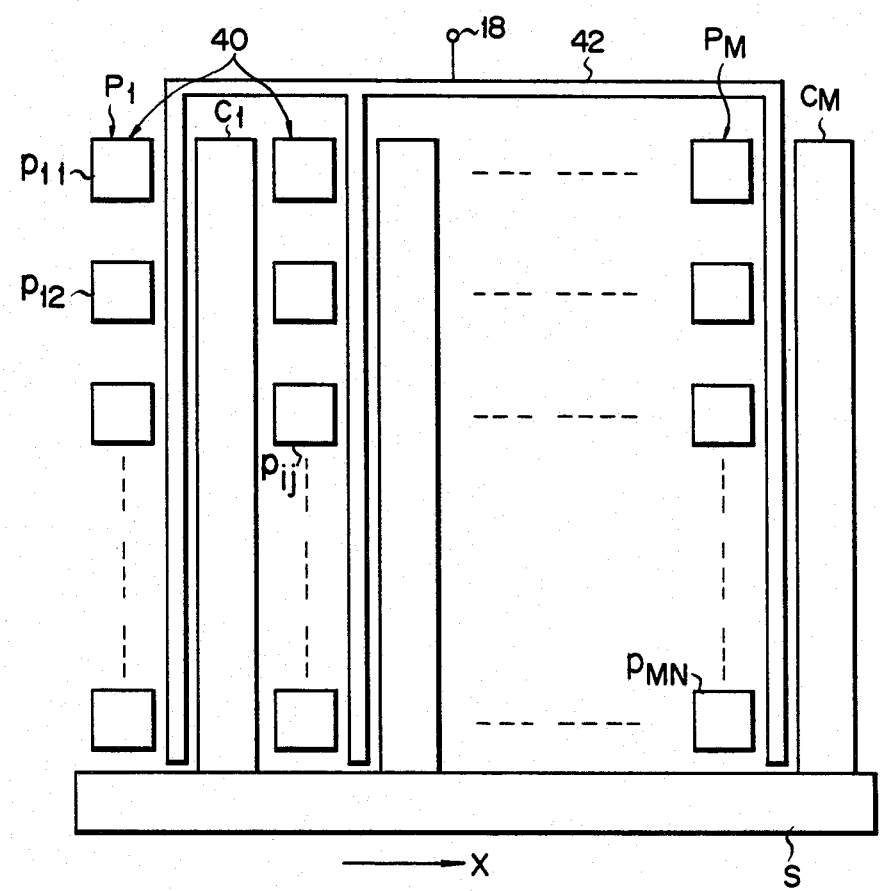
FIG. 2 illustrates a plane arrangement of image sensing region of an interline transfer type charge-coupled device (IT-CCD) included in the image sensing system shown in FIG. 1.

As shown FIG. 2, the IT-CCD 10 has a photosensing section 40 consisting of photo sensitive elements or photodiodes $p_{11}, p_{12}, \ldots, p_{ij}, \ldots, p_{MN}$ of N by M (where, N=500 and M=400, for example). The photodiodes p are arranged in a matrix manner on a CCD substrate (not shown). M units of vertical CCD shift register elements $C_1, \ldots, C_M$ are arranged adjacent and opposite to M lines of photodiodes $P_1, \ldots, P_M$.

These vertical CCD shift register elements $C_1, \ldots, C_M$ are connected to a horizontal CCD shift register S at their final transferring stages. A field shift gate (which will be hereinafter referred to as FSG) 42 is formed to have gate portions each extending between the vertical photodiode or picture element lines $P_1, \ldots, P_M$ and the vertical CCDs $C_1, \ldots, C_M$. When a pulse voltage signal (or gate control signal) is supplied from the driver 20 of FIG. 1 to the FSG 42 through the gate terminal 18, signal charges stored or integrated in the photodiodes p due to incident light radiation are transferred to the vertical CCD shift register C. The signal charges transferred to the vertical CCD shift register C are further successively transferred to the horizontal CCD shift register S every stage. Output signals of the CCD 10 are supplied to the signal processor 32 through the pre-amplifier 30.

Figure 3:
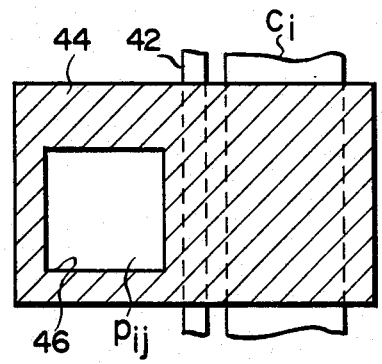
FIG. 3 shows an arrangement of that image sensing region of FIG. 2 which corresponds to one picture element.

FIG. 3 is a plane view showing, in an enlarged scale, that image pickup area which corresponds to one picture element of a cell in the photosensitive section 40 of the IT-CCD 10. In FIG. 3, a portion 44 of the image pickup area, which is shaded by oblique lines, denotes a metal electrode which shields incident light. The electrode 44 has an opening 46 and the photodiode $p_{ij}$ which corresponds to a single image sensing cell is located under the opening 46. The vertical CCD shift register $C_i$ and the FSG 42 extend under the electrode 44 and serve, therefore, as non-photosensitive areas since they are optically shielded by the electrode 44. The electrode 44 also separates the adjacent photodiodes optically from each other.

The IT-CCD 10 included in the first embodiment of the present invention is swing-driven horizontally under a specific vibration mode, which will be described below, taking a couple of frame periods $2t_F$ (each frame period $t_F$ consists of two field periods $t_a$ and $t_b$) in an image pickup operation as one cycle. In other words, the IT-CCD 10 is swing-driven in such a manner that the vibration phase is inverted between the succeeding frame periods. The swing image pickup mode of the CCD 10 will now be described in detail with reference to FIG. 4.

Figure 4A:
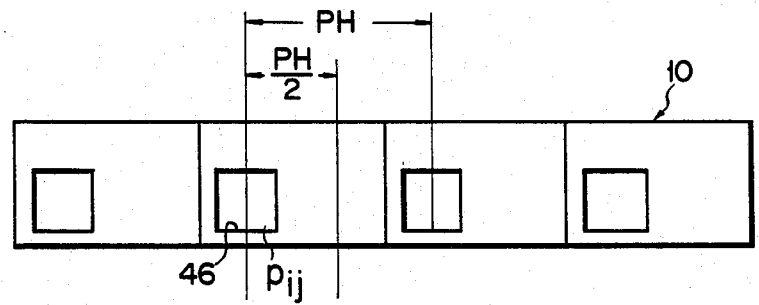
FIG. 4A is a plane view showing plural picture element regions intended to explain the swing image pickup mode attained by the IT-CCD of FIG. 1.

In order to explain the swing mode of the IT-CCD 10, FIG. 4A shows a representation of the image pickup region of a plurality of CCD cells arranged such that one-cell regions shown in FIG. 3 are aligned along the horizontal direction X. The IT-CCD 10 is position-shifted or swing-driven by the vibration table 12 (FIG. 1) relative to the incident image rays in a manner that the opening 46 corresponding to each photodiode or cell $p_{ij}$ of the CCD 20 is alternately set in different sampling positions X1 and X2 along the horizontal direction X within two succeeding frame periods $t_{F1}$ and $t_{F2}$.

Figure 4B:
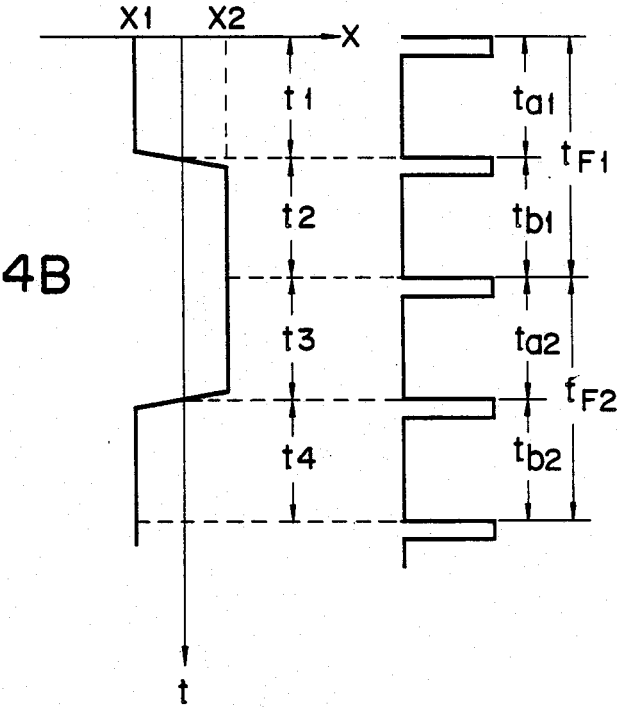
FIG. 4B is a graph showing a vibration waveform of the CCD caused corresponding to the picture element region of FIG. 4A.

FIG. 4B is a graph illustrating a vibration waveform plotted to show how the position of one cell $p_{ij}$ of the CCD 10 changes in the time duration of two succeeding frame periods $t_{F1}$ and $t_{F2}$. As is apparent from FIG. 4B, the CCD 10 is swing-driven such that each cell $p_{ij}$ is rapidly shifted from one sampling position to the other sampling position during an invalid period (blanking period) between the succeeding fields when the two succeeding frame periods in the pickup operation of the IT-CCD 10 in the field time integration mode are used as one cycle in the swing image pickup mode. The amplitude (distance between the sampling points X1 and X2) of the vibration of the CCD 10 is set to be ½ the horizontal pixel pitch PH of the CCD 10.

When any two succeeding frame periods (each consisting of A and B fields $t_a$ and $t_b$) in the CCD swing image pickup mode are defined as $t_F1$ and $t_F2$, four field periods included therein are represented by t1, t2, t3 and t4 by way of simplicity. In the A field period $t_a1$ (i.e., t1) of the first frame period $t_F1$, the center of the opening 46 for the cell $p_{ij}$ is set in the first sampling position represented by X1 so as to accumulate or integrate the optical image signal. In the B field period $t_b1$ (i.e., t2) of the first frame period $t_F1$, the CCD 10 is mechanically shifted by the vibration table 12 along the horizontal direction X such that the center of the cell $p_{ij}$ is located in the second sampling position X2. The CCD 10 performs sampling at the second sampling position X2. In the A field period $t_a2$ (i.e., t3 since this field period is the third one from the previous A frame period) of the frame period $t_F2$, the center of the cell is fixed in the second sampling position X2. In other words, the center of the cell is maintained in the sampling position X2 throughout the two field periods t2 and t3. The CCD then picks up image light and integrates the signal charges. In the B field period $t_b2$ or fourth field period t4 in one cycle of the frame period $t_F2$ within one swing image pickup, the CCD 10 is displaced or shifted such that the center of the cell is returned to the first sampling position X1. The CCD swing operation may also be described in the following manner. The CCD 10 is swing-driven in such a manner that two succeeding frame periods are used as one period thereof, the center of each cell $p_{ij}$ is kept positioned in a single sampling position during the two succeeding field periods included in the two frame periods, and the center of the cell $p_{ij}$ is shifted from one sampling position to the other sampling position in synchronism with the vertical blanking period between the A and B fields of one frame period $t_F$.

The time during which the center of the cell is being shifted between the first and second sampling positions X1 and X2 is sufficiently shorter than the time during which the center is maintained in the sampling position X1 or X2. Therefore, it may be considered that the center of the cell is positioned in either the sampling position X1 or X2 during substantially all of every field period.

FIGS. 5A to 5D schematically illustrate states of displacements or shifting of spatial sampling positions corresponding to the four cells of the IT-CCD 10 during the first to fourth field periods t1 to t4, respectively. Referring to these figures, the spatial sampling point is represented by a circle for illustrative convenience. Solid lines 1Ha, 2Ha, ..., 1Ha', 2Ha', ... denote A field scanning lines in the image pickup operation of the IT-CCD 10, and dotted lines 1Hb, 2Hb, ..., 1Hb', 2Hb', ... denote B field scanning lines in the image pickup operation of the IT-CCD 10. An arrow of each spatial sampling point indicates the direction toward which the sampling point is shifted.

Figure 5A:
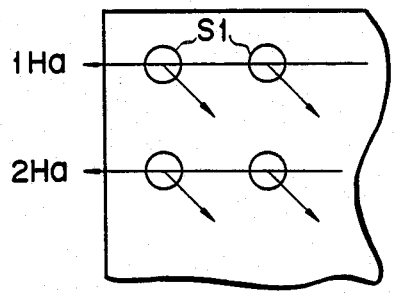
FIGS. 5A to 5D are representations showing displacements of cells on the reproduced screen during one cycle in the swing mode, respectively.
Figure 5B:
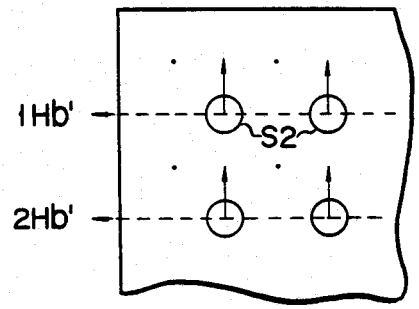
Figure 5C:
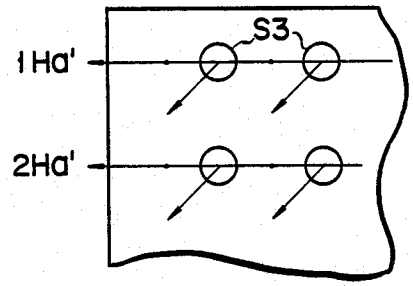
Figure 5D:
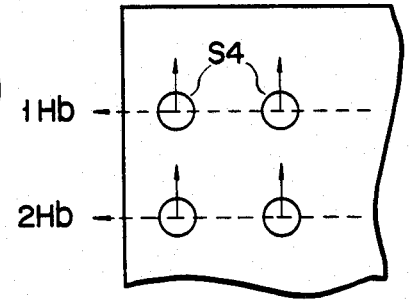

A spatial sampling point S1 in the first field t1, as shown in FIG. 5A, is shifted in the lower right direction by a combination of interlaced scanning and shifting by PH/2 along the horizontal pixel direction, and is positioned as shown in FIG. 5B. Throughout the second and third fields t2 and t3, the CCD 10 is not shifted but kept stationary. The shifting of the sampling points on the screen is performed in accordance with interlaced scanning. Therefore, the sampling points S2 are shifted upward, as shown in FIG. 5B, so that these points are positioned in the positions of the points S3 in the third field t3, as shown in FIG. 5C, respectively. From the third field t3 to the fourth field t4, the CCD 10 is shifted in such a manner that the center of the cell is shifted from the position X2 to the position X1, all the spatial sampling points S3 are shifted in the lower left direction and are positioned in the positions of the points S4, as shown in FIG. 5D, respectively. From the fourth field t4 to the first field t1 of the next vibration cycle, the CCD 10 is not shifted but its position is kept unchanged, and the sampling points S4 are shifted upward in accordance with interlaced scanning, as illustrated in FIG. 5D. Thereafter, the same operation as described above is repeated.

Figure 6A:
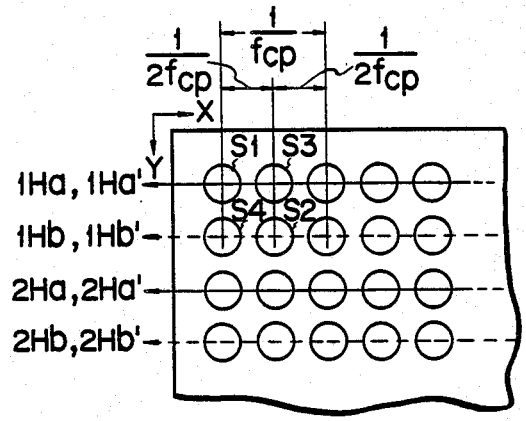
FIGS. 6A and 6B are representations of all the sampling points obtained during one cycle in the swing image pickup mode of the present invention and all the sampling points of the conventional technique, respectively.
Figure 6B:
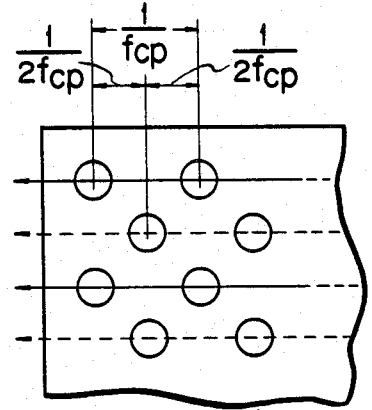

FIG. 6A illustrates the total number of sampling points S1 to S4 obtained throughout the two frame periods tF1 and tF2. When a reproduced image consisting of the respective field images is displayed using the sampling points S1 to S4, the density of the sampling points on the A and B field scanning lines along the horizontal direction becomes doubled as compared with the actual density of the horizontal pixels of the CCD 10. At the same time, the sampling points S1, S4, ... (or S3, S2, ...) can be uniformly aligned at a pitch corresponding to the vertical pixel pitch PV in the interlaced scanning. The time interval of the horizontal pixel pitch PH is determined by an inverse number of a drive frequency fcp of the horizontal read register. The pitch of the horizontal spatial sampling points becomes ½fcp. Therefore, the horizontal resolution can be increased to be twice the Nyquist limit value determined by the drive frequency of the horizontal read register. In this manner, the vertical sampling points are aligned, so that the zigzag phenomenon occurring in the high-contrast boundary line in the conventional system can be prevented. This fact contributes to the improvement in image quality. As a comparative example, FIG. 6B shows the pattern of sampling points on the reproduced picture which are obtained when the CCD chip is swung in a manner that the one frame period in the NTSC system becomes its swing period. It should be understood that the densities of the sampling points (FIG. 6A) of the reproduced image of the present invention along the vertical and horizontal directions are higher than those of the conventional reproduced image of FIG. 6B.

Furthermore, according to the swing image pickup type CCD system of the present invention, the vibration period of the CCD chip 10 for obtaining a high-quality fine picture with high resolution can be only twice that of a conventional CCD. A swing image pickup type CCD system is proposed wherein the vibration frequency can be decreased to 50%, and all the conventional problems can be solved. If the vibration frequency of the CCD chip which is required to obtain high-resolution image can be low, the vibration mechanism can be effectively used when it is constituted by a bimorph piezoelectric element using a ceramic material. When the bimorph piezoelectric element is used in the vibration mechanism, the vibration mechanism is vibrated at a lower frequency than the resonant frequency inherent to the element. In this case, ringing tends to occur at a transient time of the vibration pulse. When the vibration period is shortened, ringing can be decreased.

FIGS. 7A to 7E illustrate waveforms of signals generated from a main part of the arrangement (FIG. 1) for performing the swing image pickup operation. FIGS. 7A and 7B respectively represent a drive pulse signal for defining the vertical blanking period VB of the CCD 10 fixed to the vibration table 12, and a field shift pulse signal having pulse components generated within the vertical blanking period VB. The field shift pulse components are included in the vertical blanking period VB. The vibration table 12 receives the vibration pulse signal 28 from a drive pulse generator 26, thereby swinging the CCD 10. The vibration pulse signal 28 is a rectangular wave signal which is synchronized with the field shift pulse and which has two frame periods as one cycle, as illustrated in FIG. 7C.

The IT-CCD 10 is mechanically swung or vibrated together with the vibration table 12 in response to the vibration pulse shown in FIG. 7 and is electrically driven by a clock driver 20 in response to the horizontal clock pulse shown in FIG. 7D. The IT-CCD 10 generates an output signal (FIG. 7E) through the video signal processor 32. In this embodiment, the output signals are shifted in correspondence with the spacial sampling points upon vibration of the CCD chip 10, so that the timing of the horizontal clock pulse is shifted by $\frac{1}{2}$ clock ($\frac{1}{2}$fcp) in accordance with the vibration period, thereby obtaining the output signal corresponding to the actual spatial sampling point. The reproduced images of the first and second frames consisting of the A1 and B1 fields and the A2 and B2 fields, respectively, are added to double the horizontal resolution.

In the embodiment described above, a solid state image pickup device such as an interline transfer type CCD for transferring signal charges charged by a photosensitive section for every field to the vertical read register as the read section is vibrated in a cycle of two frames (four fields) along the horizontal pixel arrangement direction such that the vibration center falls within the blanking period, thereby doubling the number of spatial sampling points of the solid state image pickup element, and hence obtaining a reproduced image which is free from degradation of vertical resolution and which has a doubled horizontal resolution.

The solid state image pickup device of this embodiment has the following advantages even over a device having a doubled number of horizontal pixels obtained by a high-density technique.

(1) A high-density device has a narrow dynamic range since the horizontal pixel pitch is decreased to $\frac{1}{2}$ and then the saturation signal level is lowered. However, the device of the present invention has the same dynamic range as that of a device free from vibration. Therefore, the dynamic range of the device of the present invention is substantially wider than that of the high-density device if the same manufacturing method is used for both devices.

(2) The high-density device has a doubled clock frequency of the horizontal read register. Along with this increase, the drive circuit and the signal processing circuit have high power consumption, and other circuit design problems are presented. However, the device of the present invention is free from the above problems.

(3) The high-density device has a small opening area of the photosensitive section. In this sense, the non-photosensitive area cannot be decreased with respect to the total photosensitive section even if cells are packed at high density. However, the device of the present invention can receive optical data even from a region which is conventionally a non-photosensitive area. Therefore, an effective photosensitive area of the present invention becomes wider than that of the high-density device.

Figure 9:
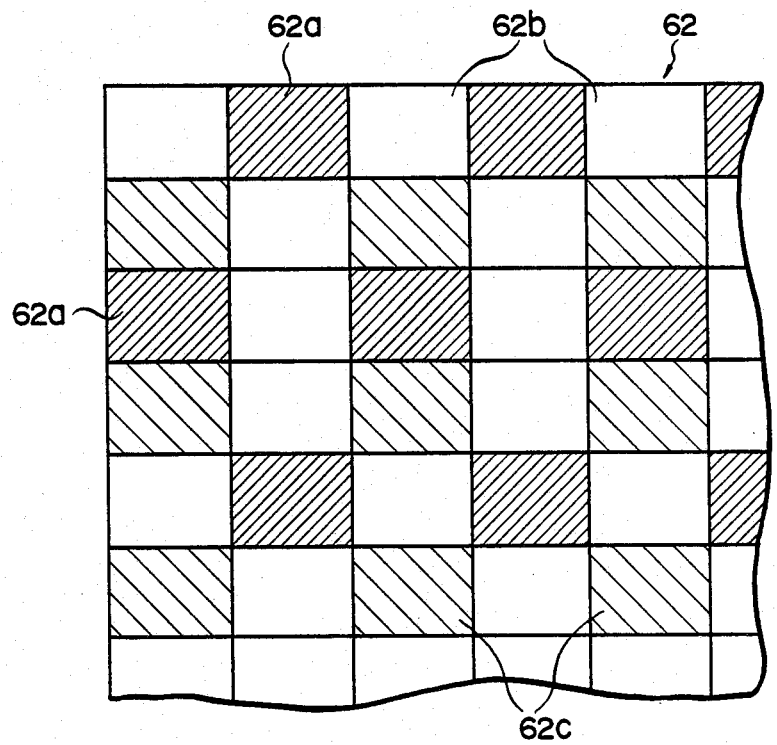
FIG. 9 is a plane view showing a color filter provided on an IT-CCD included in the system of FIG. 8.

FIG. 8 shows a second embodiment of the present invention in which a color solid-state image sensor is adopted to swing relative to incident image light according to a swing mode to which the core concept of the aforementioned swinging technique is applied. In FIG. 8, an IT-CCD 60 is provided with an optical color filter 62. The arrangement of the CCD 60 is substantially the same as that of CCD 10 of the first embodiment. As shown in FIG. 9, the color filter 62 is formed by arranging, in a plaid pattern, cyanic filter components 62a which allow a mixed color of green (G) and blue (B) video signals to transmit therethrough, whole transmission (or colorless) filter components 62b, and yellow filter components 62c which allow a mixed color of red (R) and green (G) video signals to transmit therethrough. The CCD 60 is fixed to the rear side of a vibration table 64 opposite to its image pickup side which faces a lens 66. The table 64 comprises a bimorph piezoelectric element and vibrates in a cycle of two frame periods of an image pickup operation under a predetermined complicated vibration mode in response to a swing drive signal 68 applied from a drive pulse generator 70. The CCD 60 fixed to this vibration table 64 is also vibrated or swung under the same vibration mode.

The CCD 60 is connected to a clock driver 72 through a gate terminal 74. The clock driver 72 serves to drive the CCD 60 responsive to a sync pulse signal 76 generated by a sync signal generator 78. The signal 76 is also supplied to the drive pulse generator 70 and a delay circuit 80 which functions to delay the timing of horizontal read-out of the color CCD 60 by PH/2. The output terminal of the CCD 60 is connected through a pre-amplifier 82 to an RGB separation processing unit 84 which performs an appropriate adding and subtracting process to extract three separate primary color signals (i.e., R, G and B signals 86R, 86G and 86B) in response to output signals of the CCD 60. The R and B signals 86R and 86B generally have a low frequency of about 0.5 MHz, respectively. The signals 86R, 86G and 86B are respectively supplied to R-, G- and B-process amplifiers 90R, 90G and 90B through a band expansion processing circuit (also known as a "mixed high processor") 88 and are subjected therein to signal processing such as gamma correction, white clipping and blanking insertion, thereby shaping the respective signals. The R-, G- and B-process amplifiers 90R, 90G and 90B are connected to reproducers 92R, 92G and 92B, respectively. The respective image signals from the respective circuits 92R, 92G and 92B are supplied to a color display unit 94 and are displayed as a final color image.

Figure 10A:
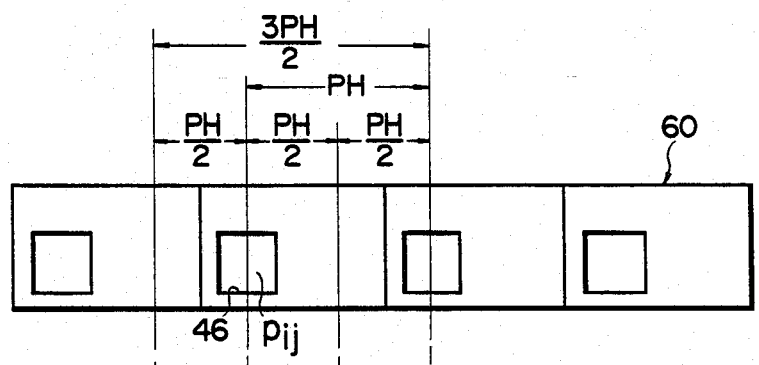
FIG. 10A is a plane view showing plural picture element regions intended to explain the swing image pickup mode attained by the IT-CCD of FIG. 1.

The image pickup operation of one pixel or one cell $p_{ij}$ of the color CCD 60 in the vibration mode will be described in detail with reference to FIG. 10. The CCD 60 has one cycle of two succeeding frame periods (each consisting of A and B field periods $t_a$ and $t_b$) in the vibration mode and is vibrated along the horizontal pixel direction X. According to this color swing image pickup operation, the CCD 60 is position-shifted or swing-driven by the vibration table 64 relative to incident light rays 96 in a stepwise manner so that an opening 46 corresponding to the cell $p_{ij}$ of the CCD 60 is sequentially shifted at four different sampling positions X1 to X4 along the horizontal direction X within a first frame period tF1 of the two frame periods $t_{F}1$ and $t_{F}2$ and is then shifted at the positions X4 to X1 during the second frame period $t_{F}2$. The shifting of the cell $p_{ij}$ from one position to another position is performed in response to a field shift pulse for transferring the signal charge charged by the corresponding cell to a vertical read CCD register C. The specific mode includes two kinds of vibrations. The first kind of vibration is performed such that the cell $p_{ij}$ is shifted between two sampling positions X2 and X3 which are spaced by a distance ½ of the horizontal pixel pitch PH from each other. This first type corresponds to the vibration (FIG. 4B) of the first embodiment of monochrome image pickup operation. The cell $p_{ij}$ is shifted between these positions X2 and X3 in response to the vertical blanking period between the two field periods included in each frame period. In the color CCD 60, the swing image pickup operation corresponds to the process for obtaining a G video signal which directly determines the resolution of the reproduced image. The second kind of vibration is performed such that the cell $p_{ij}$ is shifted between two sampling positions X1 and X4 spaced apart from each other by a distance 3/2 of the horizontal pixel pitch PH. This kind of vibration is provided only for the color image pickup system, unlike the monochrome image pickup system of the first embodiment. The swing image pickup operation in this kind of vibration with the amplitude of 3PH/2 corresponds to the process for obtaining R or B video signal. The vibration waveform of a composite signal obtained from the signals in the first and second kinds of vibrations is clearly illustrated in FIG. 10B in association with the field shift pulse of the CCD 60.

Figure 10B:
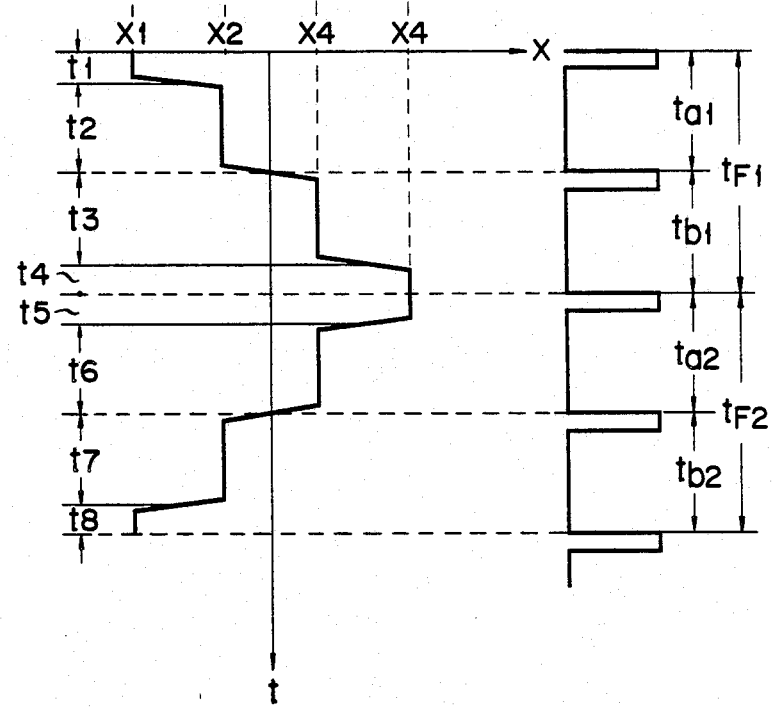
FIG. 10B is a graph showing a vibration waveform of the CCD caused corresponding to the picture element region of FIG. 10A.

Referring to FIG. 10B, the field period $t_a$ or $t_b$ is divided into two intervals by way of simplicity so as to provide eight unit intervals t1 to t8 in the two succeeding frame periods tF1 and tF2. In the four intervals t1 to t4 included in the first frame period $t_F1$, the cell $p_{ij}$ is sequentially shifted in an order of first to fourth sampling positions X1, X2, X3 and X4. In the four intervals t5 to t8 included in the second succeeding period $t_F2$, the cell $p_{ij}$ is sequentially shifted in an order of the fourth to first sampling positions X4, X3, X2 and X1. The changes in positions of the cell constitutes one cycle in the swing mode.

Figure 11:
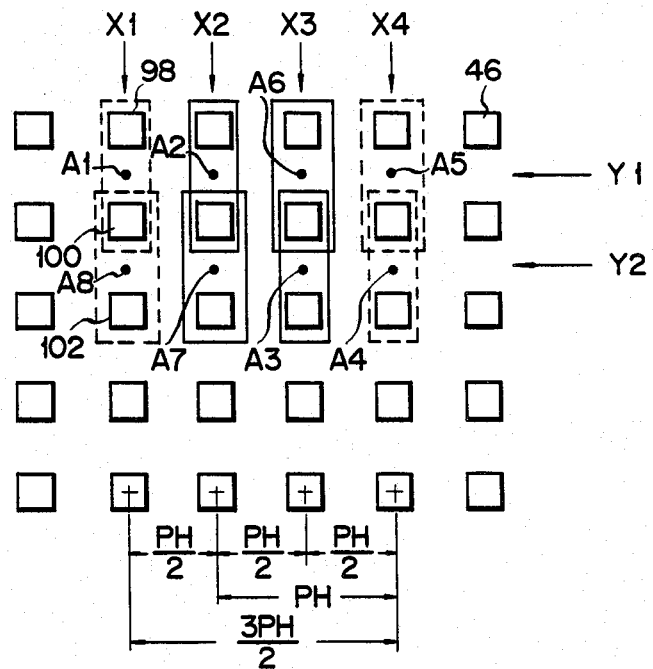
FIG. 11 is a representation showing sampling points of the reproduced picture which are obtained during one cycle in the color CCD swing image pickup mode.

The operation for obtaining eight sampling points A1 to A8 in this one period in the swing mode will be described with reference to FIG. 11.

According to the color swing image pickup technique, the center of the cell $p_{ij}$ is sequentially shifted in an order of points A1 to A8 during the unit periods t1 to t8 included in the two succeeding frame periods. Therefore, four sampling points A1, A2, A6 and 5 (or A8, A7, A3 and A4) can be obtained along the horizontal pixel direction X of the CCD 60 on the basis of the shifting of the cell $p_{ij}$ among the four sampling positions X1 to X4. Two sampling regions Y1 and Y2 are obtained along the vertical pixel direction of the CCD 60 by changing a combination of two adjacent cells along the vertical pixel direction Y. For example, one sampling point A1 in the first vertical sampling region Y1 is obtained by a combination of cell openings 98 and 100. This method can also be applied to another point A2, A6 or A5 in the first vertical sampling region Y1. In addition, one sampling point A8 in the second vertical sampling region Y2 can be obtained by a combination of cell openings 100 and 102.

Figure 12A:
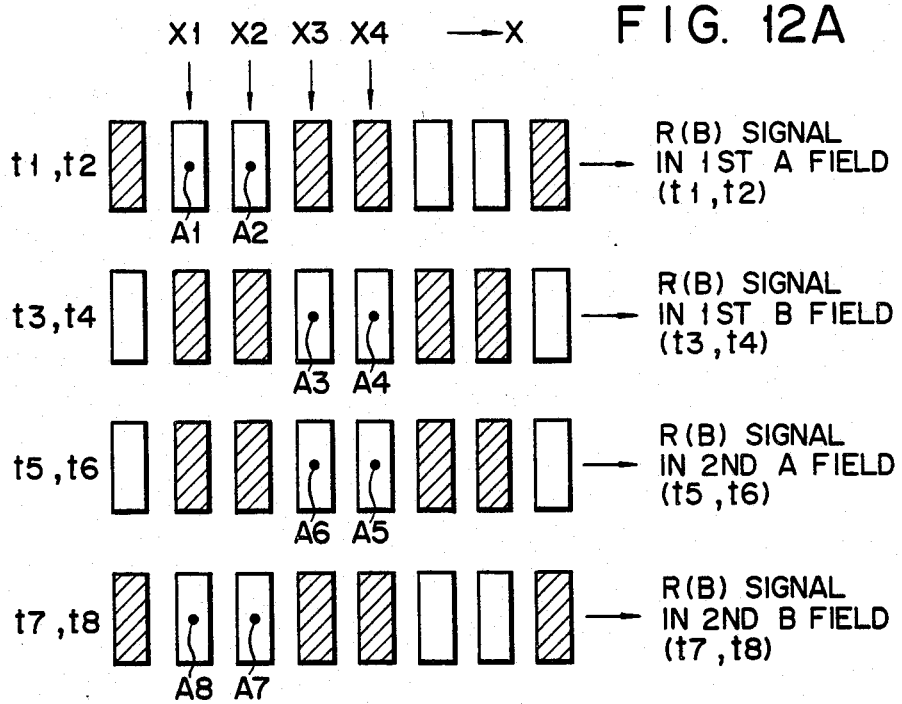
FIGS. 12A and 12B are representations for explaining mechanisms for generating respective color signal components during one cycle in the swing image pickup mode.
Figure 12B:
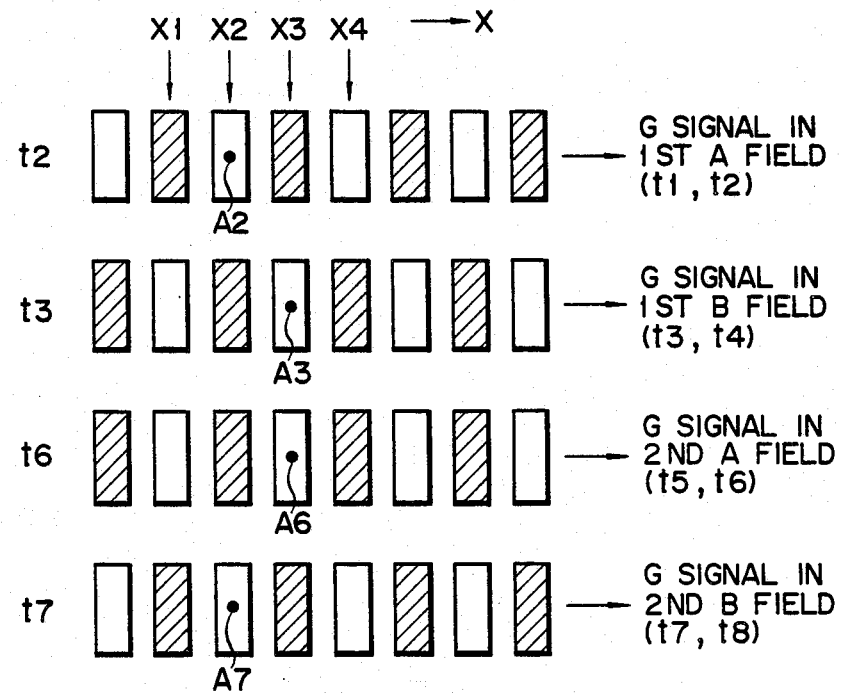

The mechanism for producing the R or B output signal and that for producing the G output signal will be described with reference to FIG. 12A and FIG. 12B, respectively, wherein the filter 62 of FIG. 9 is combined with the color swing image pickup CCD 10 capable of obtaining the eight sampling points A1 to A8 accurately aligned along the horizontal and vertical directions X and Y in one vibration cycle. In the periods t1 and t2 included in the first A field $t_a1$, the R or B signal is generated from the CCD 60 with the color filter 64. The G signal is generated from the CCD 60 in the period t2. These signals constitute field signals in the first A field $t_a1$. The R or B signal is obtained in the periods t3 and t4, and the G signal is obtained in the period t3. These signals constitute field signals in the first B field $t_b1$. Subsequently, the R or B signal and the G signal are generated from the CCD 60 in the periods t4 and t6 and the period t6, respectively. These signals constitute field signals in the second A field $t_a2$. Finally, the R or B signal and the G signal are generated from the CCD 60 in the periods t7 and t8 and the period t7, respectively, thereby obtaining the field signals in the second B field $t_b2$. As schematically illustrated in FIG. 12B, the sampling points A2, A3, A6 and A7 of the G signals which are obtained in the periods t2, t3, t6 and t7 correspond to the four sampling points S1 to S4 (shown in FIGS. 5A to 5D) obtained in the first embodiment, respectively. The resolution of the reproduced image is substantially determined by the resolution of the G signal component due to human visual sensitivity, as is well known to those skilled in the art. Therefore, it is easily understood that a high-quality image having doubled resolution along the horizontal and vertical directions is obtained by this embodiment. The reason why a high-quality color image is obtained is substantially the same as that why a high-quality monochrome image is obtained by the monochrome swing image pickup CCD of the first embodiment.

Figure 13:
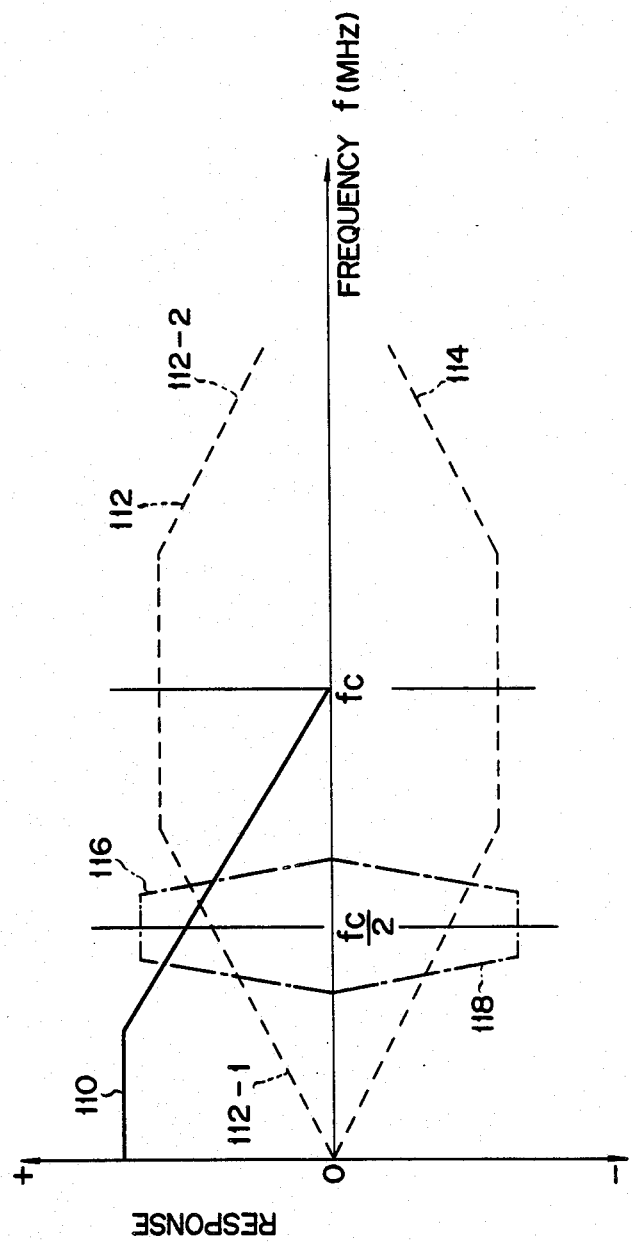
FIG. 13 is a graph showing a frequency spectrum of image pickup signals applied from the color CCD.

Furthermore, according to the second embodiment, the generation of false signals such as color moiré can be kept to a minimum in the two frame periods constituting one cycle. The frequency characteristic of G signals at this time is shown by a solid line 110 in a graph of FIG. 13. According to the frequency spectrum, modulating frequency fc of G signals are contained in addition to the G signal 110. One modulating component 112 (on the pulse side) has two side bands 112-1 and 112-2 on the upper and lower sides of the frequency fc, and one side band 112-1 overlaps the frequency band of the G signal 110. Conventionally, false signals such as color moiré are caused because of this frequency overlap between the G signal and the modulating component. According to the present invention, however, a negative modulating component 114 having a phase reversed to that of the positive modulating component 112 is present. When the G signals read out of the A and B fields included in each frame period $t_F1$ or $t_F2$ are respectively superposed upon each other on a reproduced frame image, the positive modulating component 112 is compensated by the negative modulating component 114. The modulating components 112 and 114 thus vanish substantially, to thereby eliminate "the frequency overlap" which is a cause of the moiré phenomenon. On the other hand, when consideration is paid to the R (or B) signal, it can be thought that the IT-CCD 60 vibrates between the A and B fields at an amplitude corresponding to 3/2 of the horizontal picture element pitch PH. As shown by dash-and-dot lines 116 and 118 in FIG. 13, modulating components whose carrier is a half (fc/2) of the sampling frequency fc are contained in the frequency characteristic of signals thus obtained. However, these modulating components 116 and 118 are reversed to each other in phase, and counterbalanced each other when the A and B field signals are added to gain one of the two frames included in one swing cycle. "The overlap of frequencies" which is a cause of moiré can therefore be eliminated for the same reason as already described above. When the discussion is further developed, the modulating components of opposite phases are added to each other during the two frame periods $t_F1$ and $t_F2$ included in one cycle of the swing image pickup operation when the final color image is displayed on the display unit 94, thereby elimating color moiré.

Furthermore, according to the color swing image pickup technique, the vibration frequency of the bimorph piezoelectric element constituting the vibration table 64 can be set to be 15 Hz lower than the operating frequency preset by the inherent resonance frequency. The swing waveform (FIG. 10B) of the CCD then becomes symmetrical about the frame boundary during the two frame periods $t_F1$ and $t_F2$ corresponding to one cycle of the swing mode of the CCD. The lower the vibration frequency of the piezoelectric element becomes, the less ringing occurs. Therefore, the swing image pickup operation of the color CCD 60 can be stably performed with high efficiency.

Figure 14:
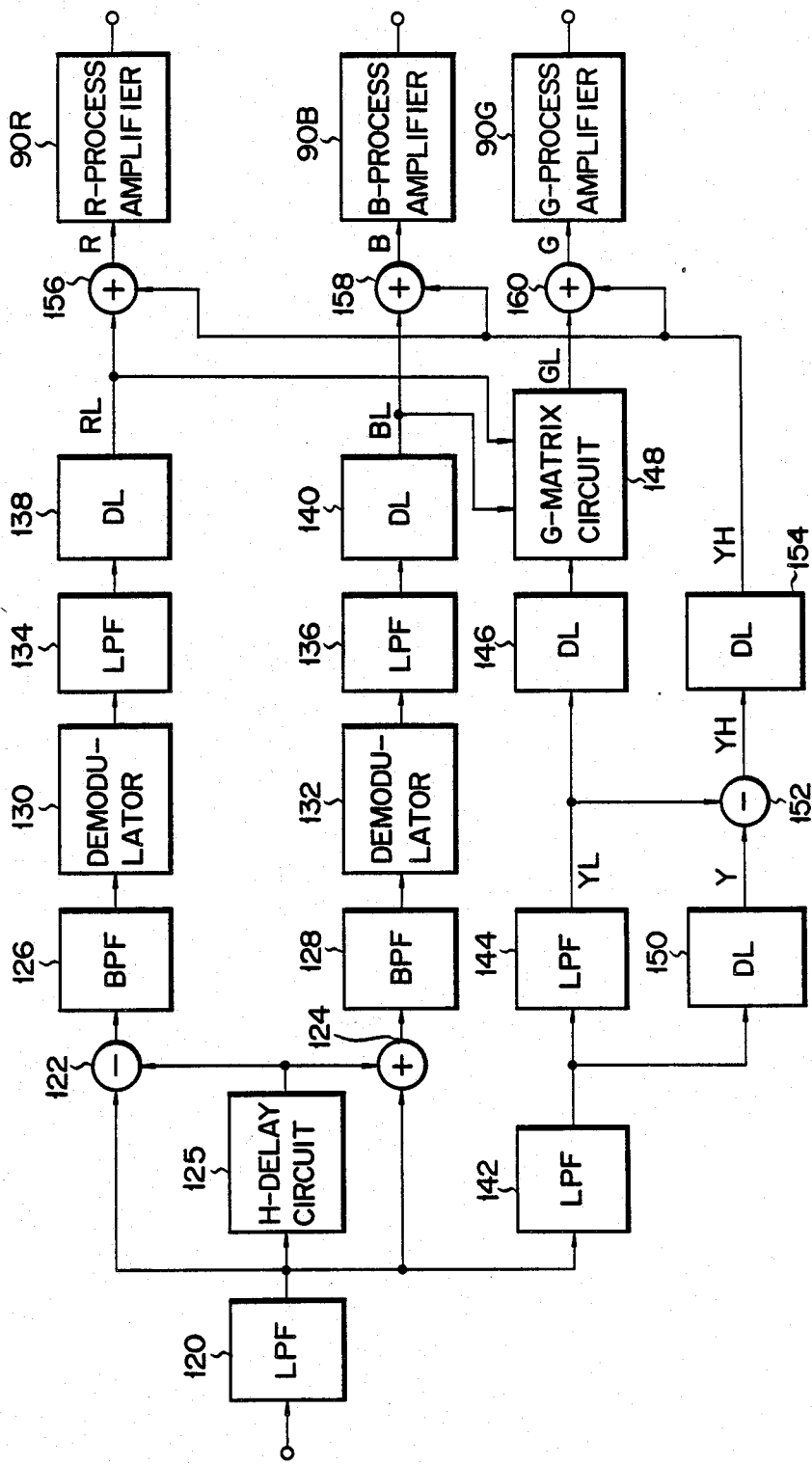
FIG. 14 is a block diagram showing a circuit configuration of a band expanding circuit contained in the image sensing system shown in FIG. 8.

In the image sensing system for performing color swing image pickup shown in FIG. 8, a circuit configuration of the band expansion processor 88 which performs band expansion of the color signal will be described in detail with reference to FIG. 14. The composite video signal from the pre-amplifier 82 of FIG. 8 is supplied to a low-pass filter (LPF) 120, and is filtered to have a frequency band limited to 5 MHz, thereby eliminating reset noise. Due to this filtering process, the composite video signal is averaged. An output signal from the LPF 120 is supplied to a subtractor 122 and an adder 124 both directly and through a delay circuit (H-delay circuit) 125 which delays a signal for one horizontal scanning period. The subtractor 122 and the adder 124 perform addition and subtraciton of the two supplied signals. Output signals from the subtractor 122 and the adder 124 are band-limited by band-pass filters (BPFs) 126 and 128, respectively, to have a frequency band of +0.5 MHz as a center of a molulation frequency (e.g., 3.58 MHz) of a color signal. RL and BL signals which respectively have low-frequency components of the R and B signals are generated from LPFs 134 and 135 through demodulators 130 and 132, respectively. The phases of the two signals are synchronized by delay lines (DLs) 138 and 140, respectively.

The output signal from the LPF 120 is also supplied to an LPF 142 and is filtered to have a frequency band limited to 3 MHz, thereby eliminating the modulating components of color signal. Thus, a luminance signal component having a frequency band of 0 to 3 MHz can be obtained. The signal from the LPF 142 is supplied to another LPF 144. The LPF 144 limits the upper limit of the frequency band of the supplied signal to 0.5 MHz, thereby obtaining a YL signal. The YL signal is supplied through a DL 146 to a G-matrix circuit 148 which produces a GL signal corresponding to the low-frequency component of the green color signal by performing a predetermined calculation of the RL, BL and YL signals. Furthermore, the Y signal from the LPF 142 is passed through a delay line (DL) 150 and is synchronized with the YL signal from the LPF 144. A subtractor 152 subtracts the YL signal having a frequency band of 0.5 MHz from the Y signal having a frequency band of 3 MHz to obtain a high-frequency luminance signal YH of 0.5 to 3 MHz. The YH signal is synchronized with the RL, BL and GL signals by a delay line (DL) 154. Thereafter, adders 156, 158 and 160 add the signal YH to the RL, BL and GL signals, respectively. Thus, frequency bands of the obtained R, G and B signals can be expanded to 0 to 3 MHz, respectively. In this case, the color signals in a frequency band higher than 0.5 MHz have the same luminance component. However, the frequency band of the color signal for forming the color image according to the NTSC system is normally 0.5 MHz, so that no problem occurs. The R, G and B signals having the expanded frequency bands are supplied to the process amplifiers 90R, 90G and 90B, respectively.

FIG. 15 is a block diagram showing a circuit arrangement of the pulse drive generator 70 shown in FIG. 8. The swing mode of the color CCD 60 which has been described with reference to FIG. 10 includes first vibration (periods t2, t3, t6 and t7) between the sampling positions X2 and X3 for improving the resolution of the picture (G signal), and second vibration (periods t1, t4, t5 and t8) between the sampling positions X1 and X4 for reduction of color moiré. The ratio of the first and second unit vibration periods (e.g., the ratio of the durations of the periods t2 and t1) must be fixed at a suitable constant value such that best effects of increasing resolution and color moiré reduction can be obtained. The pulse generator having the circuit configuration shown in FIG. 15 satisfies this requirement.

Referring to FIG. 15, an integrator 170 receives a field pulse signal FP shown in FIG. 16A which is at high level in an A field period in each frame period $t_F$ and at low level in a B field period, thus generating a trianglar wave signal 172 which have different slopes in different fields as shown in FIG. 16B. The signal 172 is supplied to a clamp circuit 174, which receives a clamp pulse signal CP having pulse components 176 generated at switching point between the A and B field periods. The triangular wave signal 172 is supplied to a comparator 178 through the clamp circuit 174. The comparator 178 compares the triangular wave signal 172 with a reference voltage Va from a variable DC power source 180, and generates a pulse-like comparison signal 182 which has a pulse component 183 shown in FIG. 16D. The pulse component 183 goes high when the triangular wave signal 172 is higher in level than the reference voltage Va. The pulse width W of the signal 182 defines a time duration (e.g., sum of the periods t4 and t5) in which the CCD cell $p_{ij}$ is kept stationary at the sampling position X1 or X4 for reduction of color moiré. Therefore, when the pulse width of the signal 182 is changed, the period (t4+t5) in which the cell $p_{ij}$ is kept at the sampling position X1 or X4 is prolonged, and therefore the time ratio of the color moiré reducing period t1, t4, t5 or t8 to resolution improving period t2, t3, t6 or t7 can be changed. The pulse width is changed by changing the reference voltage Va from the power source 180. When the output voltage Va from the power source 180 is changed, the above-described time ratio can be freely varied. For example, when the level of the voltage Va is reduced to that of a voltage Va', the width W of the pulse component 183 is expanded to a width W', thereby prolonging the color moiré reducing period (t4+t5). The signal 182 is supplied to a first control input of a multiplexer 184.

The field pulse signal FP is frequency-divided by a JK flip-flop 186 and a D flip-flop 188 to obtain a square-wave signal 190 having the waveform shown in FIG. 16E. The signal 190 has a pulse component 192 which rises at a field switching time in the first and second frame poriods $t_F1$ and $t_F2$. The signal 190 is supplied to a second control input of the multiplexer 184. Two voltage generators 194 and 196 are connected directly to analog inputs of the multiplexer 184 through while indirectly thereto through two inversion amplifiers 198 and 200. The multiplexer 184 thus receives DC voltages v1 and v2 applied from the voltage generators 194 and 196, and DC voltages v3 and v4 applied from the inversion amplifiers 198 and 200. Therefore, the multiplexer 184 generates a voltage signal which has in each frame period $t_F$ four different voltage levels v1, v2, v3, v4 corresponding to the position shift periods t1–t4 or t5–t8, and whose waveform is symmetrical about the boundary between succeeding two frames, as shown in FIG. 16F. The output signal of the multiplexer 184 is supplied to the aforementioned vibration table 64, as the swing drive signal 68, through a wave-shaping circuit 202 and an output stage current amplifier 204, which serve to remove unnecessary high frequency signal component from the signal.

Figure 17A:
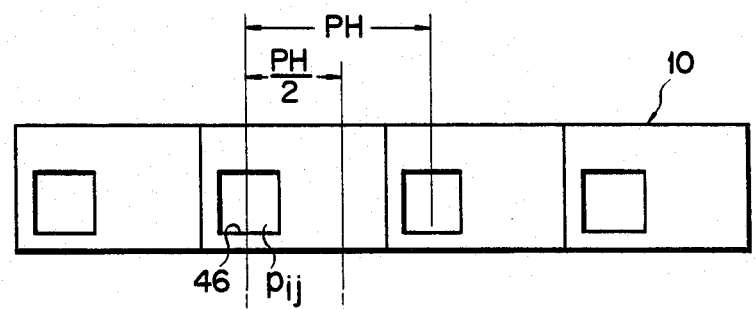
FIGS. 17A and 17B are respectively representations for explaining a modification of the swing image pickup mode set in the first embodiment.
Figure 17B:
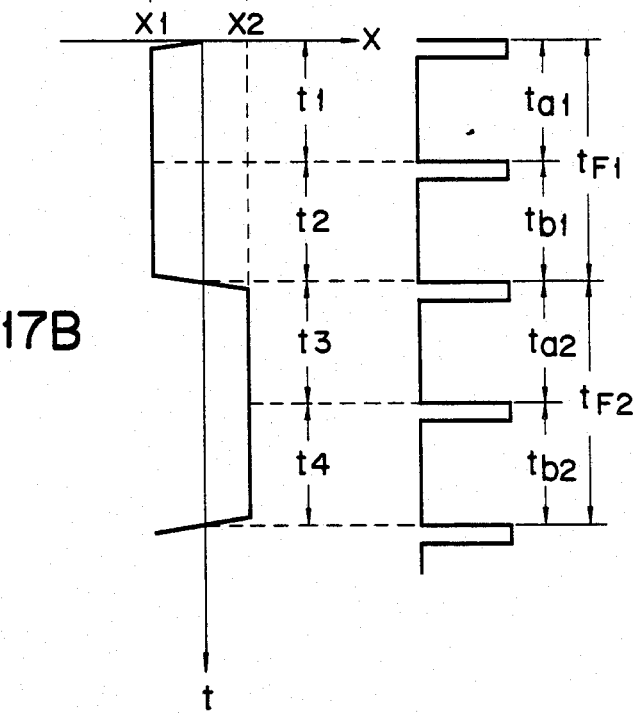
Figure 18A:
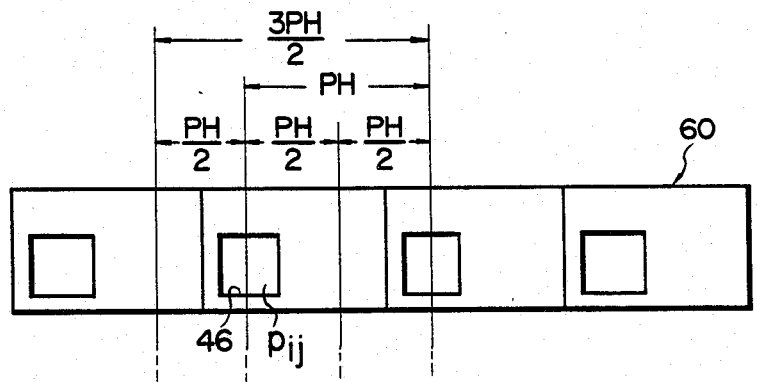
FIGS. 18A and 18B are respectively representations for explaining a modification of the color swing image pickup operation in the second embodiment.
Figure 18B:
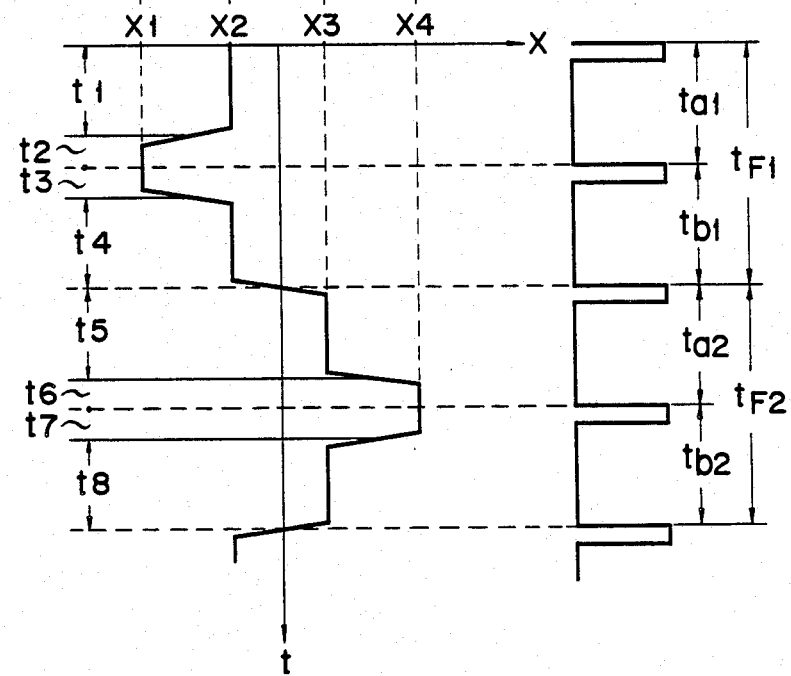

Although the present invention has been shown and described with respect to particular embodiments, various changes and modifications which are obvious to a person skilled in the art to which the invention pertains are deemed to lie within the spirit and scope of the invention. In the first and second embodiments described above, the CCD 10 or 60 is swing-driven such that the vibration waveform becomes inverted between the two succeeding frame periods. For example, in the swing mode of the first embodiment, as shown in FIG. 4B, the monochrome CCD 10 is shifted between the two sampling positions X1 and X2 in synchronism with the shifting timing between the two fields of each frame period. However, as shown in FIG. 17A and 17B, the monochrome CCD 10 may be modified such that the CCD 10 is shifted between the two sampling positions X1 and X2 in synchronism with the shifting of the succeeding frames so as to obtain the same effect. The idea of this modification can also be applied to the color CCD swing image pickup operation, and a resultant waveform is illustrated in FIG. 18B. The color CCD 60 is then swing-driven such that the opening 46 of each cell is sequentially shifted in an order of the sampling points X2, X1, X1 and X2 during the periods t1 to t4 included in the first frame period tF1, and that the opening 46 of each cell is sequentially shifted in an order of the sampling points X3, X4, X4 and X3 during the periods t5 to t8 included in the second frame period $t_F2$.

The present invention has been described in accordance with a television system substantially complying with the NTSC system However, the television system is not limited to the NTSC system, but can be extended to the SECAM system, the PAL system or a modified system thereof. The present invention can also be applied to a low- or high-speed image pickup system. When the present invention is applied to electronic cameras, the vibration of the image pickup device must be synchronized with the on/off timing of the optical shutter. In this case, the image pickup device is vibrated at different amplitudes in the A and B fields while the optical shutter is opened.

What is claimed is:

1. An apparatus for picking up incoming image light, said apparatus comprising:
    (a) solid-state image sensor means for picking up the image light in accordance with an interlaced scanning technique and for generating signal charges which represent field images for one frame in response to light radiation representing image information, said image sensor means comprising,
    a sensing section provided with at least one linear cell array having cells to receive said light radiation and generate and store charges which correspond to said light radiation, and
    at least one transferring section arranged adjacent to said at least one linear cell array and extending along said cell array to read out and transfer the charges stored in said sensing section; and
    (b) swing-driver means, coupled to said image sensor means, for (i) mechanically vibrating said image sensor means along a horizontal direction substantially perpendicular to said linear cell array in a swing mode such that one vibration period corresponds to first and second frame periods including first to fourth field periods, whereby each cell of said linear cell array is physically shifted from a first sampling position to a second sampling position in said first frame period and then shifted back from said second sampling position to said first sampling position in the succeeding second frame period within said one vibration period, and for (ii) swing-driving said image sensor means in combination with electrical interlaced scanning in such a manner that each cell sequentially generates at least four sampling points corresponding to four pixels arranged in a matrix form on a pickup image screen within an interlaced scanning period corresponding to said one vibration period.

2. The apparatus according to claim 1, wherein said swing-driver means swing-drives said image sensor means in such a manner that each cell is shifted between said first and second sampling positions in synchronism with said first and second frame periods within said one vibration period, said first to fourth field periods consisting of two field periods included in said first frame period and two field periods included in said second frame period.

3. The apparatus according to claim 1, wherein said swing-driver means comprises vibration table means for vibrating said image sensor means in such a manner that each cell is shifted from said first sampling position to said second sampling position in said first and second field periods corresponding to said two field periods of said first frame period, while each cell is shifted from said second sampling position to said first sampling position in said third and fourth field periods corresponding to said two field periods of said second frame period.

4. The apparatus according to claim 1, further comprising a color filter member mounted on an image pickup face of said image sensor means which receives the light radiation.

5. The apparatus according to claim 4, wherein said swing-driver means swing-drives said image sensor means in such a manner that each cell is shifted among first to fourth sampling positions aligned in the horizontal direction in accordance with said swing mode having a vibration obtained by combining a first vibration with a first amplitude and a second vibration with a second amplitude, thereby allowing each cell to shift to different image pickup positions relative to said incoming image light at different times within each field period so as to perform an image pickup operation.

6. The apparatus according to claim 5, wherein said swing-driver means swing-drives said image sensor means in such a manner that each cell is shifted between said first and second sampling positions within said first frame period and between said third and fourth sampling positions within second frame period, each cell being sequentially positioned in said first and second sampling positions within said first field period, in said first and second sampling positions within the second field period, in said third and fourth positions within said third field period, and in said fourth and third positions within said fourth period.

7. The apparatus according to claim 5, a distance between said second and third sampling positions, which corresponds to the amplitude of said first vibration, is set to half the cell arranging pitch of said cell array, while a distance between said first and fourth sampling positions, which corresponds to the amplitude of said second vibration, is set to substantially two-thirds the cell arranging pitch.

8. The apparatus according to claim 6, wherein a distance between said second and third sampling positions, which corresponds to the amplitude of said first vibration is set to half the cell arranging pitch of said cell array, while a distance between said first and fourth sampling positions, which corresponds to the amplitude of said second vibration is set to substantially two-thirds the cell arranging pitch.

* * * * *